United States Patent [19]

Asai et al.

[11] Patent Number: 4,602,156
[45] Date of Patent: Jul. 22, 1986

[54] GRADATION CORRECTING METHOD FOR LIGHT-SENSITIVE MATERIAL

[75] Inventors: Eiichi Asai; Takao Komaki; Yuma Adachi, all of Kanagawa, Japan

[73] Assignee: Fuji Photo Film Co., Ltd., Kanagawa, Japan

[21] Appl. No.: 547,683

[22] Filed: Nov. 1, 1983

[30] Foreign Application Priority Data

Nov. 4, 1982 [JP] Japan .................. 57-193771

[51] Int. Cl.$^4$ .............................................. G03C 5/16
[52] U.S. Cl. ............................ 250/327.2; 250/484.1
[58] Field of Search ............ 250/327.2, 505.1, 484.1; 364/414

[56] References Cited

U.S. PATENT DOCUMENTS

| | | | |
|---|---|---|---|
| 3,487,559 | 1/1970 | Freedmen | 250/505.1 |
| 4,276,473 | 6/1981 | Kato et al. | 250/327.2 |
| 4,302,672 | 11/1981 | Kato et al. | 250/327.2 |
| 4,306,290 | 12/1981 | Kato et al. | 364/414 |
| 4,310,886 | 1/1982 | Kato et al. | 364/414 |
| 4,346,406 | 8/1982 | Kato et al. | 358/174 |
| 4,473,849 | 9/1984 | Cool | 358/345 |

Primary Examiner—Carolyn E. Fields
Assistant Examiner—Richard Hanig
Attorney, Agent, or Firm—Sughrue, Mion, Zinn, Macpeak, and Seas

[57] ABSTRACT

In a radiation image recording system wherein a stimulable phosphor carrying a radiation image stored therein is scanned by stimulating rays to emit light in proportion to the radiation energy stored, and the emitted light is converted to an electric signal which is processed and used to reproduce a visible image in a light-sensitive material, a value within the range of 0.2 to 0.5 and two values at least 0.5 different from each other within the range of 0.4 to 2.6 are selected as the reference optical density values of the reproduced image. An image is once recorded in the light-sensitive material by using reference signals representing the reference values, and the optical densities at the image portions corresponding to the reference values are measured. Differences between the measured values and values on a reference gradation curve are corrected so that the sensitivity is equal to the sensitivity on the reference curve at the portion corresponding to the value selected within the range of 0.2 to 0.5, and the gradient is equal to the gradient on the reference curve with respect to the density value range of 0.4 to 2.6.

3 Claims, 3 Drawing Figures

GRADATION CORRECTING METHOD FOR LIGHT-SENSITIVE MATERIAL

BACKGROUND OF THE INVENTION

1. Field of the Invention

This invention relates to a method of correcting the gradation of a radiation image. This invention particularly relates to a method of adjusting the gradation of a reproduced image according to the recording material, development processing conditions, or the like, for the reproduced image in a radiation image recording and reproducing system using a stimulable phosphor.

2. Description of the Prior Art

A new system for recording and reproducing a radiation image by use of a stimulable phosphor is disclosed, for example, in U.S. Pat. Nos. 4,258,264; 4,315,318; 4,276,473; and 4,346,295. In this system, the stimulable phosphor is caused to absorb a radiation passing through an object and then stimulated by light energy to emit the radiation energy stored therein as light. The emitted light is detected and converted to an electric signal used for reproducing a visible image.

This radiation image recording and reproducing system using the stimulable phosphor is advantageous over the conventional radiography using a silver halide photographic material in that the image can be recorded over a very wide range of radiation exposure and further in that the electric signal used for reproducing the visible image can be processed as desired to improve the image quality for viewing, particularly for diagnostic purposes. In more detail, since the amount of light emitted upon stimulation after the radiation energy is stored in the phosphor varies over a very wide range in proportion to the amount of energy stored therein, it is possible to obtain an image having desirable density regardless of the amount of exposure of the phosphor to the radiation by converting the emitted light to an electric signal and changing the level of the electric signal to a desirable level corresponding to the desirable optical density of the image reproduced on a photographic film or the like.

In practical use, the range of the radiation exposure is limited by the dynamic range of the electric signal system used therefor. According to the experiments, it was possible to obtain images of desirable optical density even when the exposure value was changed over 3 orders, that is even when the dose of radiation was changed over the range of 1 to 1000.

This is very advantageous in practical use. For instance, when there are differences in exposure among a number of radiation images or there are over- or under-exposure images in a number of radiation images, these images can be processed to have the same level of optical density finally. Accordingly, mistakes made in the exposure step can be easily corrected. Further, the optical density of the finally obtained image can be selected simply by changing the level of the electric signal used for reproducing the image and, accordingly, it is possible to easily obtain an image having a desirable density for any kind of image. In other words, in the radiation image of the human body, the desirable density is different depending upon the kind of the image. In one kind or part of the human body, a high density is desirable for obtaining high diagnostic efficiency and accuracy and, in another kind or part, a low density is desirable. In the conventional radiography, the exposure is controlled to obtain the desirable density for the various kinds of images. In this sense, the above-mentioned system utilizing the stimulable phosphor and a gradation processing means is very advantageous. Furthermore, in the conventional radiography, a number of films of different sensitivity are prepared to be accommodated to a number of intensifying screens of different sensitivity. In the above-mentioned system, however, it is unnecessary to prepare a number of films of different sensitivity since one kind of film can be accommodated to various conditions of exposure and various sensitivities of the intensifying screens by later changing the level of the electric signal as desired.

As mentioned above, in the radiation image recording and reproducing system using a stimulable phosphor, the image information having a very wide range of level corresponding to the very wide range of exposure is once stored in the stimulable phosphor and is then read out and converted to an electric signal and finally converted to a visible image after processing the electric signal as desired. Therefore, the optical density of the finally obtained visible image or reproduced image can be controlled to the level desirable for viewing, particularly for diagnostic purposes. Thus, a radiation image having an improved image quality, particularly a high diagnostic efficiency and accuracy can be obtained.

However, when an image is actually reproduced on a recording material in the aforesaid radiation image recording and reproducing system, there occur changes in the conditions of the reproducing terminal sections, for example, changes in the kind of the recording material (light-sensitive material such as a photographic film), i.e. changes in the gradation (hard or soft), sensitivity or the like, changes in the development conditions, or changes in the power of the light source in the reproducing apparatus (due to deterioration with time). Therefore, it is not necessarily possible to obtain a reproduced image having a desirable density.

When the radiation image is used for medical diagnosis, the aforesaid problem interferes with the diagnosis, and it becomes impossible to correctly and accurately make a diagnosis. Particularly, diagnosis is difficult when a change in the symptoms of the patient with time has to be examined, since it is necessary to make the diagnosis by comparing many visible images reproduced under different conditions. In this case, if the sensitivity or the gradation changes among the images according to the reproducing conditions, it is very inconvenient from the viewpoint of diagnosis.

SUMMARY OF THE INVENTION

The primary object of the present invention is to provide a method of correcting a change in the density (sensitivity, gradient) of a reproduced image generated by a change in the kind of the light-sensitive material for finally recording the reproduced image, a change in the development conditions, or a change in the conditions of the reproducing apparatus in the aforesaid radiation image recording and reproducing system.

Another object of the present invention is to provide a method of correcting the gradation of a radiation image, which provides reproduced images of the same gradation regardless of the reproduction output conditions.

The present invention provides a method of correcting the gradation of a radiation image reproduced in a light-sensitive material in a radiation image recording and reproducing system wherein a stimulable phosphor carrying the radiation image stored therein in a pattern of radiation energy is scanned by stimulating rays to emit light of an amount proportional to the level of the radiation energy stored, the emitted light is converted to an electric signal having a level corresponding to the emitted amount of light in a signal processing section, and a visible image corresponding to said radiation image is reproduced in a light-sensitive material by use of the electric signal in an image reproducing section, the method of correcting the gradation of the radiation image reproduced in a light-sensitive material comprising the steps of:

(i) as the reference optical density values of the reproduced image, selecting an arbitrary value within the range of 0.2 to 0.5 and two arbitrary values at least 0.5 different from each other within the range of 0.4 to 2.6, (ii) recording a latent image in the light-sensitive material for image reproduction by use of reference signals representing said reference optical density values as said electric signals, (iii) developing said light-sensitive material to obtain a reproduced image, (iv) measuring the optical densities at the portions of the reproduced image which correspond to said three reference optical density values, and (v) on the basis of a comparison of the measured values with values on a reference gradation curve, adjusting at least one of said signal processing section and said image reproducing section so that the sensitivity is equal to the sensitivity on said reference gradation curve at the portion corresponding to said arbitrary value selected within the density value range of 0.2 to 0.5, and the gradient is equal to the gradient on said reference gradation curve at the portion corresponding to the density value range of 0.4 to 2.6.

In the present invention, visible images of the same gradation can be reproduced regardless of a change in the reproduction output conditions, for example, a change in the gradation, sensitivity or the like of the light-sensitive material, a change in the development processing conditions, or a change in the energy of the light source in the reproducing apparatus. Particularly when the radiation image is used for medical diagnosis, the aforesaid technical effect of the method in accordance with the present invention is desirable and necessary for recording the radiation images showing a change in the symptoms of the same patient with time, reproducing the radiation images, and making a diagnosis by comparing the reproduced images. Thus, the method of the present invention is very advantageous in practical use.

The reason that the sensitivity is adjusted with respect to the density value range of 0.2 to 0.5 in the present invention is that, in the case of a radiation image, the reproducing quality at light image portions (reproduced image portions of a low density) is particularly important. This is because, for example, in the recording of a frontal chest radiation image, the density critical to whether the bronchus image is reproduced or not at the mediastinal septum portion is within or near the density value range of 0.2 to 0.5, and also in the case of a limb bone image, the density critical to whether the bone ridge image is reproduced or not is within or near the density value range of 0.2 to 0.5. When the density value within the aforesaid range is reproduced to a value lower than the predetermined value, that is, when the sensitivity is decreased, the image to be reproduced such as the bronchus image or the bone ridge image becomes unreproduced. Therefore, the sensitivity must be adjusted so that the density value within the aforesaid range is reproduced always to a predetermined value.

The reason why the gradient is adjusted with respect to the density value range of 0.4 to 2.6 is that the gradation curve of a general light-sensitive material is approximately linear within the density value range of 0.4 to 2.6. This linear relationship is employed for obtaining image signal values having density values between 0.4 and 2.6. Within this density value range, two values different and apart from each other at least by 0.5 (in density value) are employed since the gradient in the portion within this density value range can be sufficiently accurately obtained if the two density values employed are about 0.5 different from each other.

In the present invention, the signal processing section comprises a means for conducting various processings such as a frequency processing and a gradation processing, for example, on the digital signal obtained by photoelectrically detecting the light emitted from the stimulable phosphor, so as to obtain a reproduced image having an improved image quality, particularly a high diagnostic efficiency and accuracy. The signal processing section is provided, for example, with a computer for processing the digital signal.

The image reproducing section comprises a means for two-dimensionally scanning a light-sensitive material such as a photographic film with a light beam modulated with a sequential image signal. The scanning means may, for example, be of the type wherein a film held on a high-speed rotating drum is scanned with a modulated light beam directed in the rotation axis direction of the drum (sub-scanning direction), or may be of the type wherein a film moved at a low speed in the subscanning direction is scanned with a modulated light beam directed at a high speed in the main scanning direction. As the light source in the image reproducing section, a high-brightness lamp, a laser beam source or the like is used.

The aforesaid various changes in the reproduction output conditions also embrace a change in the brightness of the light source in the image reproducing section (particularly a slow change with time in the brightness thereof). Actually, problems are presented by a change in the kind of the film, a change in the conditions of the development processing section (for example, a change with time in the developing capacity of the developing solution depending upon the time lapsed since the developing solution was refreshed), a change in the film characteristics due to a change in the manufacture lot of films (for example, a change with time in the film characteristics), or the like. Since these changes cannot easily be estimated quantitatively and are complicatedly associated with one another, it is not always possible to determine the degrees of the changes by calculation.

In the present invention, as the reference optical density values of the reproduced image, an arbitrary value is selected within the range of 0.2 to 0.5, and two arbitrary values different from each other at least by 0.5 are selected within the range of 0.4 to 2.6. A reproduced image is once recorded in a film under the actual reproducing conditions by use of reference signals representing the reference optical density values. The optical densities at the image portions corresponding to the three reference optical density values are measured, and the differences between the measured values and values on a reference gradation curve are corrected. Therefore, it becomes possible to obtain a reproduced image of a desirable density very easily and very accurately. Further, in the present invention, since the sensitivity at the portion corresponding to the arbitrary value selected within the density value range of 0.2 to 0.5, and the gradient (γ) at the portion corresponding to the density value range of 0.4 to 2.6 are used as the factors for correcting the aforesaid differences between the measured values and the values on the reference gradation curve, the operation for correcting the differences becomes very easy and effective.

More specifically, according to the present invention, the final visible images of uniform gradation can be obtained regardless of differences in gradation or sensitivity of the photosensitive material, and fluctuation in the various output conditions such as development conditions, fluctuation in the power of the exposure light source of the recording apparatus. This is desirable and necessary particularly when the change of the conditions of the same object is periodically recorded over a long period of time and the reproduced images are compared with each other for observing the progress or change of a diseased part. Thus, the gradation correction method in accordance with the present invention is very advantageous in practical use.

DESCRIPTION OF THE PREFERRED EMBODIMENTS

The present invention will hereinbelow be described in further detail with reference to the accompanying drawings.

Figure 1:
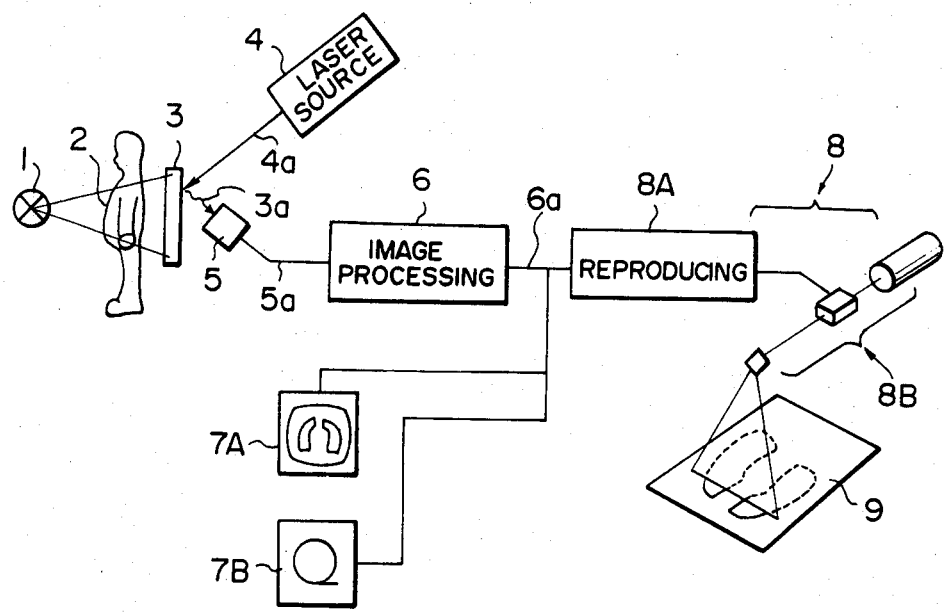
FIG. 1 is a schematic view showing the whole radiation image recording and reproducing system wherein the gradation correction method in accordance with the present invention is employed.

FIG. 1 shows the whole radiation image recording and reproducing system wherein the method of correcting the gradation of a radiation image reproduced in a light-sensitive material in accordance with the present invention is employed.

A stimulable phosphor sheet 3 is exposed to X-rays emitted from an X-ray source 1 and passed through an object 2 to have an X-ray image of the object 2 stored in the phosphor sheet 3. Then, the phosphor sheet 3 carrying the X-ray image stored therein is scanned with a laser beam 4a emitted as stimulating rays from a laser beam source 4. When exposed to the laser beam 4a, the phosphor sheet 3 emits light 3a in proportion to the X-ray energy stored therein. The emitted light 3a is photoelectrically detected by a photomultiplier 5 and converted to a sequential image signal 5a corresponding to the X-ray image. The image signal 5a is sent to an image processing section 6 for conducting the image processings such as a frequency processing and a gradation processing. After the image processings are conducted, an image signal 6a for image reproducing is sent out of the image processing section 6.

A part of the image signal 6a is sent to a monitor television 7A and a storage apparatus 7B such as a magnetic tape storage apparatus. Another part of the image signal 6a is sent to an image reproducing apparatus 8 for monitoring and image reproducing. In the image reproducing apparatus 8, an optical latent image is recorded in a light-sensitive film 9 by use of a drive circuit 8A and a laser scanner 8B. The light-sensitive film 9 carrying the latent image recorded therein is developed to a visible image (a reproduced image) by a developing apparatus (not shown).

Figure 2:
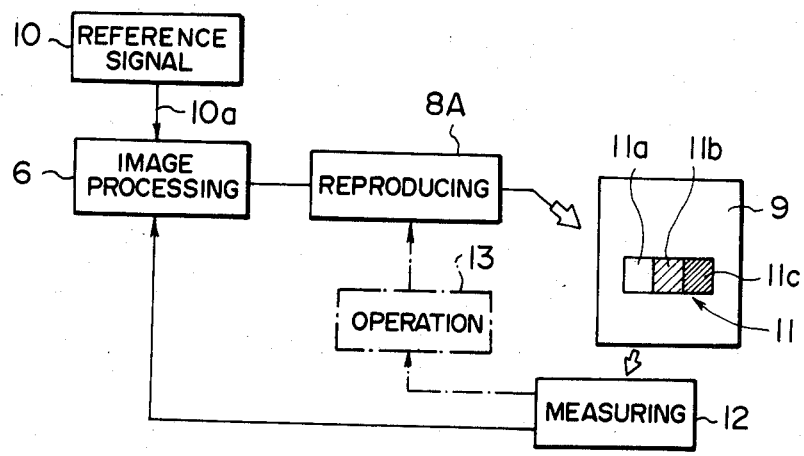
FIG. 2 is an explanatory view showing an embodiment of the method in accordance with the present invention.

FIG. 2 shows an embodiment of the gradation correction method in accordance with the present invention. In the selection of the reference optical density values of the reproduced image, for example, 0.3 is selected as the arbitrary value within the range of 0.2 to 0.5, and 0.5 and 2.0 are selected as the two arbitrary values at least 0.5 different from each other within the range of 0.4 to 2.6. Reference signals 10a representing these reference optical density values are sent from a reference signal generator 10 to the image processing section 6. On the basis of the reference signals 10a, a test pattern (test tablet) 11 comprising patches 11a, 11b and 11c corresponding to the respective reference optical density values is recorded in a light-sensitive film 9, in which a reproduced image is to be recorded, in the image reproducing apparatus 8. (The test pattern 11 is reproduced to a visible image by development processing.)

Thereafter, the optical densities of the patches 11a, 11b and 11c of the test pattern 11 are measured by use of a densitometer 12. The measured values are then compared with the density values on a reference gradation curve shown in FIG. 3. Points on this reference gradation curve A are determined by the characteristics of the photosensitve material used in the inventive system, in accordance with the above-mentioned reference signals 10a. Namely, the values of the optical densities which should properly be recorded in the light-sensitive film 9 by the reference signals 10a are compared with the aforesaid measured values at the points of densities of 0.3, 0.5 and 2.0. More specifically, the measured value obtained at the patch 11a for the optical density of 0.3 is compared with the value of the optical density of 0.3 which corresponds to a reference signal level N1 on the reference gradation curve A (i.e. the target optical density 0.3), and the difference therebetween is calculated. Further, the gradient, i.e. the gamma (γ) value of the portion within the optical density range of 0.5 to 2.0 is calculated from the measured values obtained at the patch 11b for the optical density of 0.5 and the patch 11c for the optical density of 2.0 is compared with the gradient of $$\gamma 0 = \frac{2.0 - 0.5}{N3 - N2}$$

of the corresponding portion on the reference gradient curve A, and the difference between these gradients is calculated. The signals representing the differences thus calculated are sent to the image processing section 6 and used for correcting the read-out image signal 5a.

Namely, by correcting the read-out image signal 5a on the basis of the differences between the measured values and the reference values, a signal of a level equal to the signal level N1 of the reference signal corresponding to the density of 0.3 is actually reproduced to the optical density of 0.3 in the final reproduced image.

A signal of a level within the range between the signal level N2 of the reference signal for the density of 0.5 and the signal level N3 of the reference signal for the density of 2.0 is reproduced at the desired target gradient ($\gamma 0$).

The calculations for the aforesaid correction can easily be conducted by using the operation circuit in the image processing section 6. For example, when an electronic computer is used for conducting operations of the digital image signals in the image processing section 6, the aforesaid correction can be carried out very easily by correcting the digital signals.

Alternatively, as shown by the chain lines in FIG. 2, it is also possible to use another operation circuit 13 for conducting the operation for correction based on the aforesaid measured value. In this case, the results obtained by the operation circuit 13 are sent to the drive circuit 8A of the image reproducing apparatus. In the drive circuit 8A, the gain and/or the bias level of the amplifier used for modulation in the image reproducing apparatus are corrected on the basis of the aforesaid results, thereby to correct the optical density finally reproduced in the light-sensitive film 9.

Figure 3:
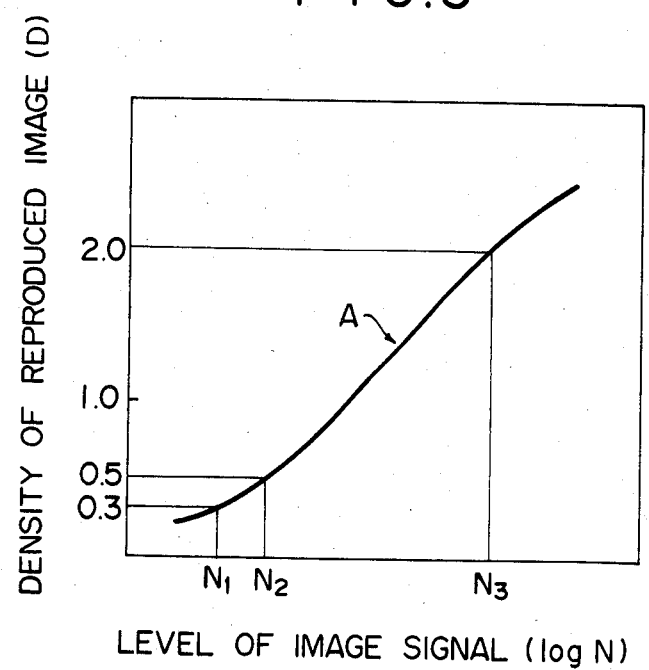
FIG. 3 is a graph showing a reference gradation curve wherein the logarithmic value (log N) of the image signal level (N) is plotted on abscissa and the optical density of the reproduced image is plotted on ordinate.

In general, a gradation curve has the same pattern as the reference gradation curve A shown in FIG. 3. Therefore, by correcting the sensitivity (i.e. the vertical direction in the graph shown in FIG. 3) at the density of 0.3 and by correcting the gradient (i.e. the inclination in the graph shown in FIG. 3) at the portion within the density range of 0.5 to 2.0, it is possible to correct the whole gradation to a desirable condition. That is, in order to always obtain the reproduced images of the same gradation, it is necessary only that the density (sensitivity) at the portion within the density range of 0.2 to 0.5 (critical portion) and the gradient ($\gamma$) at the portion within the density range of 0.4 to 2.6 (approximately the whole image portion) among the reproduced images be made equal. By making the two corrections, it is possible to obtain reproduced images having visually the same gradation as a whole.

Accordingly, when the aforesaid two factors are corrected in accordance with the present invention, it is possible to always obtain the reproduced images having equal gradation regardless of the gradation and the sensitivity of the light-sensitive materials.

We claim:

1. A method of correcting the gradation of a radiation image reproduced in a light-sensitive material in a radiation image recording and reproducing system wherein a stimulable phosphor carrying the radiation image stored therein in a pattern of radiation energy is scanned by stimulating rays to emit light of the amount proportional to the level of the radiation energy stored, the emitted light is converted to an electric signal having a level corresponding to the emitted amount of light in a signal processing section, and a visible image corresponding to said radiation image is reproduced in a light-sensitive material by use of the electric signal in an image reproducing section, the method of correcting the gradation of the radiation image reproduced in a light-sensitve material comprising the steps of:
 (i) as the reference optical density values of the reproduced image, selecting an arbitrary value within the range of 0.2 to 0.5 and two arbitrary values at least 0.5 different from each other within the range of 0.4 to 2.6,
 (ii) recording a latent image in the light-sensitive material for image reproduction by use of reference signals representing said reference optical density values as said electric signals,
 (iii) developing said light-sensitive material to obtain a reproduced image,
 (iv) measuring the optical densities at the portions of the reproduced image which correspond to said three reference optical density values, and
 (v) on the basis of a comparison of the measured values with values on a reference gradation curve, said values corresponding to points on a line between said two arbitrary values on said reference gradation curve, adjusting at least one of said signal processing section and said image reproducing section so that the sensitivity is equal to the sensitivity on said reference gradation curve at the portion corresponding to said arbitrary value selected within the density value range of 0.2 to 0.5, and the gradient is equal to the gradient on said reference gradation curve at the portion corresponding to the density value range of 0.4 to 2.6.

2. A method as defined in claim 1 wherein said electric signal is a digital signal, said signal processing section comprises a digital signal processing means, and said adjustment is the correction of the digital signal.

3. A method as defined in claim 1 wherein said image reproducing section comprises a reproducing means provided with a circuit for changing the optical density reproduced in the light-sensitve material by changing the gain and/or the bias level of an amplifier, and said adjustment is the adjustment of the gain and/or the bias level of the amplifier.

* * * * *